United States Patent
Chen et al.

(10) Patent No.: US 8,026,705 B2
(45) Date of Patent: Sep. 27, 2011

(54) BOOTSTRAP CIRCUIT AND BULK CIRCUIT THEREOF

(75) Inventors: Li-Chieh Chen, Changhua County (TW); Yu-Min Sun, Taipei County (TW); Yu-Lee Yeh, Taipei County (TW)

(73) Assignee: Advanced Analog Technology, Inc., Hsinchu (TW)

( * ) Notice: Subject to any disclaimer, the term of this patent is extended or adjusted under 35 U.S.C. 154(b) by 496 days.

(21) Appl. No.: 12/354,780

(22) Filed: Jan. 16, 2009

(65) Prior Publication Data

US 2010/0117610 A1    May 13, 2010

(30) Foreign Application Priority Data

Nov. 13, 2008   (TW) .............................. 97143844 A

(51) Int. Cl.
G05F 1/44       (2006.01)
G05F 1/445      (2006.01)
G05F 1/565      (2006.01)

(52) U.S. Cl. ....................................... 323/282; 323/271

(58) Field of Classification Search .................. 323/223, 323/224, 265, 271, 282, 284, 285, 288, 351
See application file for complete search history.

(56) References Cited

U.S. PATENT DOCUMENTS

| | | | | |
|---|---|---|---|---|
| 5,627,460 A * | 5/1997 | Bazinet et al. | ................ | 323/288 |
| 6,172,493 B1 * | 1/2001 | Grant | ............................. | 323/288 |
| 6,489,758 B2 * | 12/2002 | Moriconi et al. | ............. | 323/288 |
| 7,271,573 B2 * | 9/2007 | Sutardja | ........................ | 323/351 |
| 7,348,766 B2 * | 3/2008 | Hachiya et al. | ................ | 323/284 |
| 7,368,957 B2 * | 5/2008 | Clarkin et al. | ................. | 327/110 |
| 7,479,770 B2 * | 1/2009 | Kohout et al. | ................. | 323/271 |
| 7,514,908 B2 * | 4/2009 | Hosokawa et al. | ............ | 323/222 |
| 7,538,531 B2 * | 5/2009 | Ishii et al. | ...................... | 323/282 |
| 7,737,666 B2 * | 6/2010 | Sutardja et al. | ................ | 323/222 |
| 2002/0036487 A1 * | 3/2002 | Moriconi et al. | ............. | 323/288 |
| 2005/0237046 A1 * | 10/2005 | Sutardja | ........................ | 323/351 |
| 2009/0237059 A1 * | 9/2009 | Chiba | ............................ | 323/288 |

* cited by examiner

Primary Examiner — Gary L Laxton
Assistant Examiner — Nusrat Quddus
(74) Attorney, Agent, or Firm — Winston Hsu; Scott Margo

(57) ABSTRACT

A bootstrap circuit is utilized in a bulk circuit using an NMOS transistor as a power switch. The bootstrap circuit includes a first PMOS transistor coupled between an internal power source and an offset capacitor, and a second PMOS transistor coupled between the gate of the first PMOS transistor and the offset capacitor, and an NMOS transistor coupled between the gate of the first PMOS transistor and ground. When the power switch is turned on, the second PMOS transistor is turned on for turning off the first PMOS transistor. When the power switch is turned off, the NMOS transistor is turned on for turning on the first PMOS transistor.

28 Claims, 5 Drawing Sheets

BOOTSTRAP CIRCUIT AND BULK CIRCUIT THEREOF

BACKGROUND OF THE INVENTION

1. Field of the Invention

The present invention relates to a bootstrap circuit, and more particularly, to a bootstrap circuit applied in a bulk circuit using an N-channel Metal Oxide Semiconductor (NMOS) transistor as a power switch.

2. Description of the Prior Art

Please refer to FIG. 1. FIG. 1 is a diagram illustrating a conventional bulk circuit 100 using an NMOS transistor as a power switch. As shown in FIG. 1, the bulk circuit 100 comprises a switch control circuit 100, a bootstrap circuit 120, a gate driving circuit GD, a transistor $Q_1$, a diode $D_2$, an inductor $L_1$, two feedback resistors $R_{FB1}$ and $R_{FB2}$, and an output capacitor $C_{OUT}$. The transistor $Q_1$ may be an NMOS transistor and is utilized as a power switch of the bulk circuit 100. The operational principle of the bulk circuit 100 is familiar to those skilled in the art and is not illustrated hereinafter for brevity.

The bulk circuit 100 is utilized for lowering down the voltage $V_{IN}$ (for example, 40 volts) provided by a DC voltage source $V_{IN}$ so as to generate a DC output voltage source $V_{OUT}$ to output a lowered DC voltage $V_{OUT}$ (for example, 35 volts). In addition, in FIG. 1, the voltage source $V_{CC}$ (for example, 7 volts) can be generated by the voltage source $V_{IN}$ through a Low Drop Out (LDO) regulator. The voltage source $V_{SS}$ is a ground end (providing voltage with 0 volt).

The gate driving circuit GD comprises two transistors $Q_2$ and $Q_3$. The transistors $Q_2$ and $Q_3$ are a PMOS transistor and an NMOS transistor respectively. The gate driving circuit GD is utilized for enhancing the signal outputted from the switch control circuit 110 so as to drive the transistor $Q_1$. Furthermore, the gate driving circuit GD, in the FIG. 1, actually functions as an inverter.

The bootstrap circuit 120 comprises a diode $D_1$ and an offset capacitor $C_{OS}$. It can be seen in FIG. 1 that the voltage $V_X$ and $V_Y$ respectively on the nodes X and Y of the bootstrap circuit 120 are utilized as the bias voltages for the gate driving circuit GD.

The feedback resistors $R_{FB1}$ and $R_{FB2}$ are coupled in series to the output end of the bulk circuit 100 to form a voltage divider for providing a partial voltage of the output voltage $V_{OUT}$ as a feedback voltage $V_{FB}$.

The switch control circuit 110 outputs the switch control signal $SW_1$ according to the feedback voltage $V_{FB}$. The switch control signal $SW_1$ may be a Pulse Width Modulation (PWM) signal, wherein the duty ratio of the switch control signal $SW_1$ is related to the feedback voltage $V_{FB}$. The driving switch control signal $SW_D$ is obtained by the gate driving circuit GD enhancing the switch control signal $SW_1$ so as to drive the transistor $Q_1$, which means the enhanced switch control signal $SW_1$ (the driving switch control signal $SW_D$) is capable of turning on/off the transistor $Q_1$. In addition, the switch control signal $SW_1$ is inverted to the driving switch control signal $SW_D$.

When the transistor $Q_1$ is turned off, the power of the voltage source $V_{IN}$ is not conducted to the node Y, which means the voltage $V_Y$ on the node Y is 0 volt or less at the time. Supposed that the forward voltage $V_{D1}$ of the diode $D_1$ is 0.7 volt, the voltage source $V_{CC}$ can charge the offset capacitor $C_{OS}$ up to 6.3 volts by 7 volts (deducting the forward voltage $V_{D1}$ of the diode $D_1$).

When the transistor $Q_1$ is turned on, the power of the voltage source $V_{IN}$ is conducted to the node Y, which means the voltage $V_Y$ on the node Y is 40 volts at the time. Supposed that the forward voltage $V_{D1}$ of the diode $D_1$ is 0.7 volt and the offset capacitor $C_{OS}$ has finished charging, the voltage $V_X$ on the node X is 46.3 volts. That is, the voltage range of the gate driving circuit GD capable of driving is from 40 volts to 46.3 volts. Therefore, at the time, supposed that the threshold voltage $V_{TH1}$ of the transistor $Q_1$ is 1.5 volts, the voltage on the gate of the transistor $Q_1$ has to be more than 41.5 volts to turn on the transistor $Q_1$. Since the voltage range of the gate driving circuit GD capable of driving is from 40 volts to 46.3 volts at the time, the transistor $Q_1$ can be effectively turned on.

Consequently, by means of the bias voltages $V_X$ and $V_Y$ that the bootstrap circuit 120 provides to the gate driving circuit GD, the switch control signal $SW_1$ can effectively turn the transistor $Q_1$ on or off by the gate driving circuit GD.

However, since the forward voltage of the diode is so high that when the transistor $Q_1$ is turned on, the voltage range of gate driving circuit GD capable of driving is not wide enough to fully turn on the transistor $Q_1$. In other words, for fully turning on the transistor $Q_1$, the voltage $V_{CC}$ provided by the voltage source $V_{CC}$ must be high enough to fully turn on transistor $Q_1$. However, since, in the modern fabrication, the size of the circuit elements on the wafer is becoming smaller and smaller, the voltage the circuit elements on the wafer can withstand is becoming lower and lower. Thus, if the voltage source $V_{CC}$ is too high, the circuit elements on the wafer are easily to be damaged. In this condition, either, for protecting the circuit elements on the wafer, the voltage source $V_{CC}$ has to be low enough, causing the transistor $Q_1$ not to be fully turned on, or, for fully turning on the transistor $Q_1$, the voltage source $V_{CC}$ has to be high enough, easily damaging the circuit elements on the wafer. Both methods are not convenient.

SUMMARY OF THE INVENTION

The present invention provides a bootstrap circuit applied in a bulk circuit. The bulk circuit has an inductor, a diode, a voltage divider, a switch control circuit, a gate driving circuit, and a first transistor. The inductor has a first end, and a second end. The second end of the inductor is utilized for generating an output voltage. The diode is coupled between the first end of the inductor and a first voltage source. The voltage divider is coupled between the second end of the inductor and the first voltage source. The voltage divider is utilized for generating a feedback voltage according to a partial voltage of the output voltage. The switch control circuit is utilized for generating a first, a second and a third switch control signals according to the feedback voltage. The gate driving circuit is coupled to the switch control circuit, for generating a driving switch control signal according to the first switch control signal. The first transistor has a first end, a second end and a control end. The first end of the first transistor is coupled to an input voltage source, the second end of the first transistor is coupled to the first end of the inductor, and the control end of the first transistor is coupled to the gate driving circuit. The first transistor couples the first end of the first transistor to the second end of the first transistor according to the gate driving signal. The bootstrap circuit comprises a second transistor, a third transistor, a fourth transistor and an offset capacitor. The second transistor comprises a first end, a second end and a control end. The first end of the second transistor is coupled to a second voltage source. The second transistor couples the first end of the second transistor to the second end of the second transistor according to a signal of the control end of the second transistor. The third transistor comprises a first end, a second end and a control end. The first end of the third transistor is coupled to the control end of the second transistor, the second end of the third transistor is coupled to the second end of the second transistor, and the control end of the third transistor is coupled to the switch control circuit for receiving the second switch control signal. The third transistor couples the first end of the third transistor to the second end of the third transistor according to the second switch control signal. The fourth transistor comprises a first end, a second end and a control end. The first end of the fourth transistor is coupled to the control end of the second transistor, the second end of the fourth transistor is coupled to the first voltage source, and the control end of the fourth transistor is coupled to the switch control circuit for receiving the third switch control signal. The fourth transistor couples the first end of the fourth transistor to the second end of the fourth transistor according to the third switch control signal. The offset capacitor comprises a first end and a second end. The first end of the offset capacitor is coupled to the second end of the second transistor, and the second end of the offset capacitor is coupled to the first end of the inductor.

The present invention further provides a buck circuit. The buck circuit comprises an inductor, a diode, a voltage divider, a switch control circuit, a gate driving circuit, a first transistor and a bootstrap circuit. The inductor comprises a first end and a second end. The second end of the inductor is utilized for generating an output voltage. The diode is coupled between the first end of the inductor and the first voltage source. The voltage divider is coupled between the second end of the inductor and the first voltage source. The voltage divider is utilized for generating a feedback voltage according the partial voltage of the output voltage. The switch control circuit is for generating a first switch control signal, a second switch control signal, and a third switch control signal according to the feedback voltage. The gate driving circuit is coupled to the switch control circuit, for generating a driving switch control signal according to the first switch control signal. The first transistor comprises a first end, a second end and a control end. The first end of the first transistor is coupled to an input voltage source, the second end of the first transistor is coupled to the first end of the inductor, and the control end of the first transistor is coupled to the gate driving circuit. The first transistor couples the first end of the first transistor to the second end of the first transistor according to the driving switch control signal. The bootstrap circuit comprises a second transistor, a third transistor, a fourth transistor and an offset capacitor. The second transistor comprises a first end, a second end and a control end. The first end of the second transistor is coupled to the second voltage source. The second transistor couples the first end of the second transistor to the second end of the second transistor according to a signal of the control end of the second transistor. The third transistor comprises a first end, a second end and a control end. The first end of the third transistor is coupled to the control end of the second transistor, the second end of the third transistor is coupled to the second end of the second transistor, and the control end of the third transistor is coupled to the switch control circuit, for receiving the second switch control signal. The third transistor couples the first end of the third transistor to the second end of the third transistor according to the second switch control signal. The fourth transistor comprises a first end, a second end and a control end. The first end of the fourth transistor is coupled to the control end of the second transistor, the second end of the fourth transistor is coupled to the first voltage source, and the control end of the fourth transistor is coupled to the switch control circuit, for receiving the third switch control signal. The fourth transistor couples the first end of the fourth transistor to the second end of the fourth transistor according to the third switch control signal. The offset capacitor comprises a first end and a second end. The first end of the offset capacitor is coupled to the second end of the second transistor, and the second end of the offset capacitor is coupled to the first end of the inductor.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating the circuit operation when the power switch of the buck circuit is turned on.

DETAILED DESCRIPTION

Figure 1:
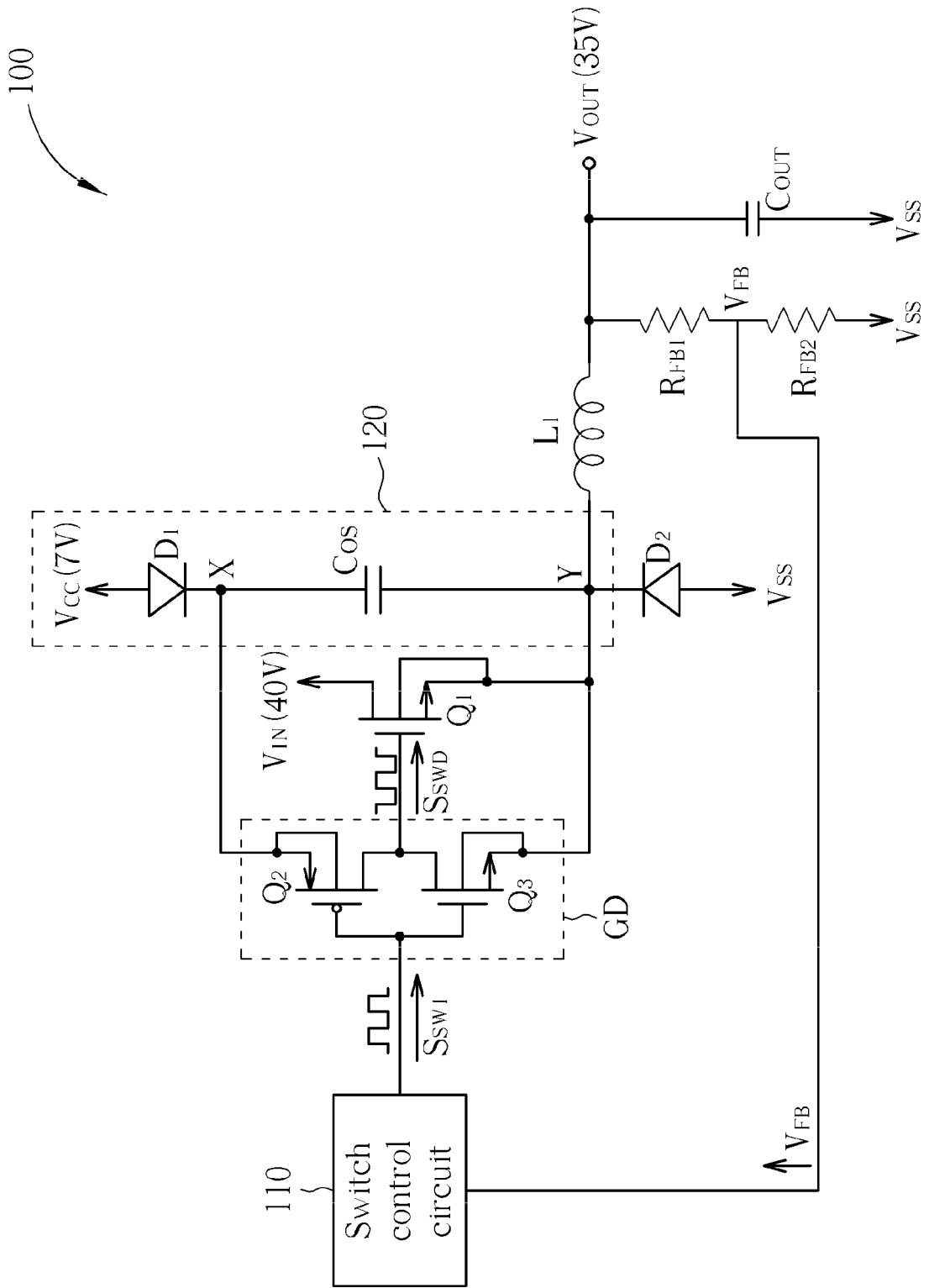
FIG. 1 is a diagram illustrating a conventional bulk circuit using an NMOS transistor as a power switch.
Figure 2:
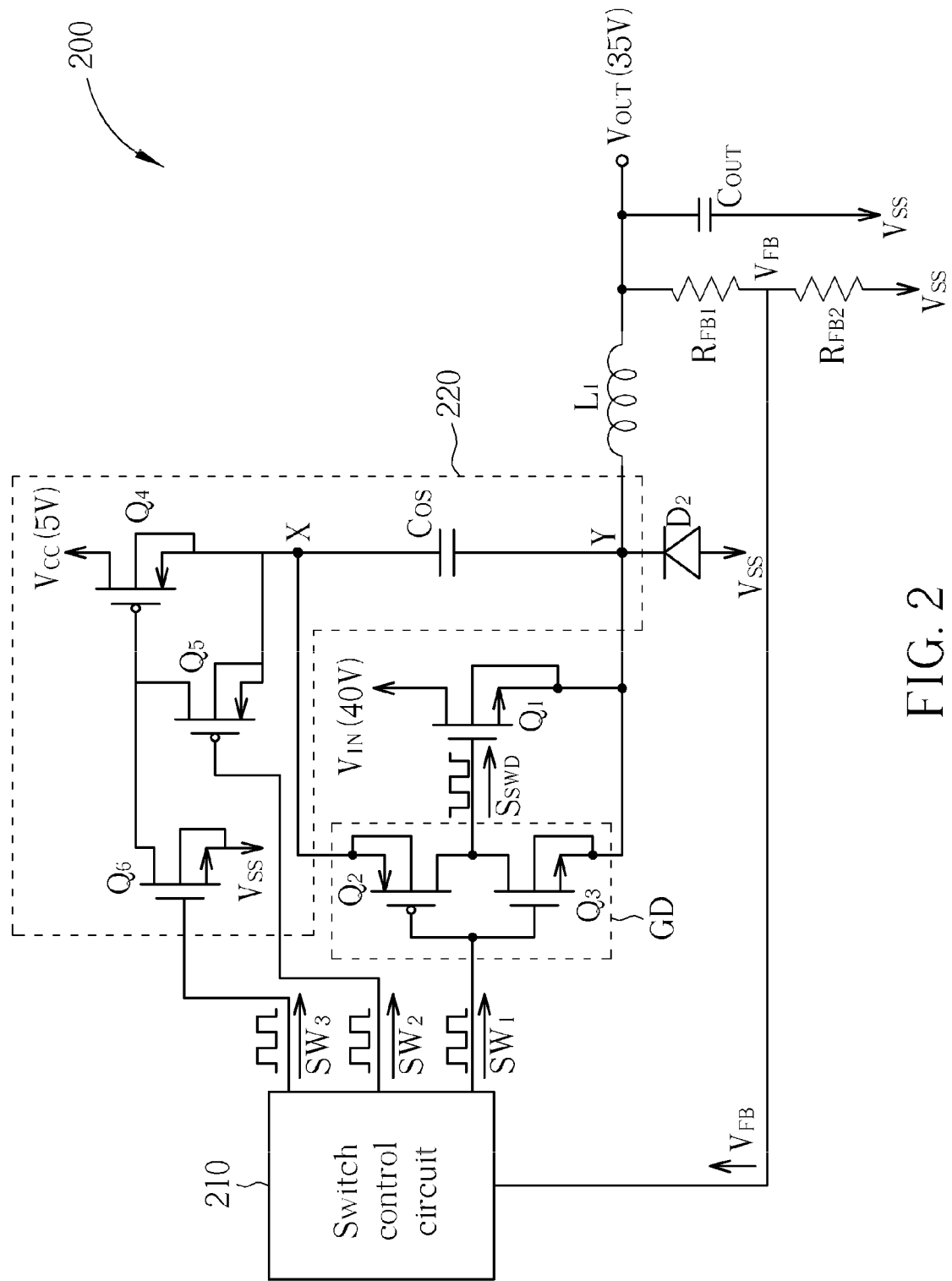
FIG. 2 is a diagram illustrating the buck circuit of the present invention.

Please refer to FIG. 2. FIG. 2 is a diagram illustrating the buck circuit 200 of the present invention. As shown in FIG. 2, the buck circuit 200 comprises a switch control circuit 210, a bootstrap circuit 220, a gate driving circuit GD, a transistor $Q_1$, a diode $D_2$, an inductor $L_1$, two feedback resistor $R_{FB1}$ and $R_{FB2}$, and an output capacitor $C_{OUT}$. The transistor $Q_1$ may be an NMOS transistor and is utilized as the power switch of the buck circuit 200.

The bulk circuit 200 is utilized for lowering down the voltage $V_{IN}$ (for example, 40 volts) provided by a DC voltage source $V_{IN}$ so as to generate a DC output voltage source $V_{OUT}$ to output a lowered DC voltage $V_{OUT}$ (for example, 35 volts). In addition, in FIG. 2, the voltage source $V_{CC}$ (for example, 5 volts) is generated by the voltage source $V_{IN}$ through an LDO regulator. The voltage source $V_{SS}$ is a ground end (providing a voltage with 0 volt).

The gate driving circuit GD comprises two transistors $Q_2$ and $Q_3$. The transistors $Q_2$ and $Q_3$ are a PMOS transistor and an NMOS transistor respectively. The gate driving circuit GD is utilized for enhancing the signal outputted from the switch control circuit 210 so as to drive the transistor $Q_1$. Furthermore, the gate driving circuit GD, in the FIG. 2, is actually utilized as an inverter.

The bootstrap circuit 220 comprises three transistors $Q_4$, $Q_5$ and $Q_6$, and an offset capacitor $C_{OS}$. The transistors $Q_4$ and $Q_5$ are PMOS transistors and the transistor $Q_6$ is an NMOS transistor. It can be seen in FIG. 2 that the voltage $V_X$ and $V_Y$ respectively on the nodes X and Y of the bootstrap circuit 220 are utilized as the bias voltages for the gate driving circuit GD. The transistor $Q_4$ of the bootstrap circuit 220 is utilized for replacing the diode $D_1$ of the conventional buck circuit 120 and functioning similar to a diode. Because the voltage drop across the transistor $Q_1$ when the transistor $Q_1$ is turned on is about 0.1~0.3 volt (assume 0.3 volt hereinafter), which is much smaller than the forward voltage of the diode $D_1$, the voltage source $V_{CC}$ is allowed to provide a lowered voltage $V_{CC}$, e.g. 5 volts, and the gate driving circuit GD is still capable of fully turning on the transistor $Q_1$.

The feedback resistors $R_{FB1}$ and $R_{FB2}$ are coupled in series to the output end of the bulk circuit 200 to form a voltage divider for providing a partial voltage of the output voltage $V_{OUT}$ as a feedback voltage $V_{FB}$.

The switch control circuit 210 outputs the switch control signals $SW_1$, $SW_2$ and $SW_3$ according to the feedback voltage $V_{FB}$. The switch control signal $SW_1$ may be a PWM signal, wherein the duty ratio of the switch control signal $SW_1$ is related to the feedback voltage $V_{FB}$. The driving switch control signal $SW_D$ is obtained by the gate driving circuit GD enhancing the switch control signal $SW_1$ so as to drive the transistor $Q_1$, which means the enhanced switch control signal $SW_1$ (the driving switch control signal $SW_D$) is capable of turning on/off the transistor $Q_1$. In addition, the switch control signal $SW_1$ is inverted to the driving switch control signal $SW_D$. Furthermore, the switch control signals $SW_2$ and $SW_3$ are utilized for turning the transistors $Q_5$ and $Q_6$ on or off and can be the same as the switch control signal $SW_1$. However, generally, for avoiding large transient current occurring, slight phase differences exist among the switch control signals $SW_1$, $SW_2$ and $SW_3$.

Figure 3:
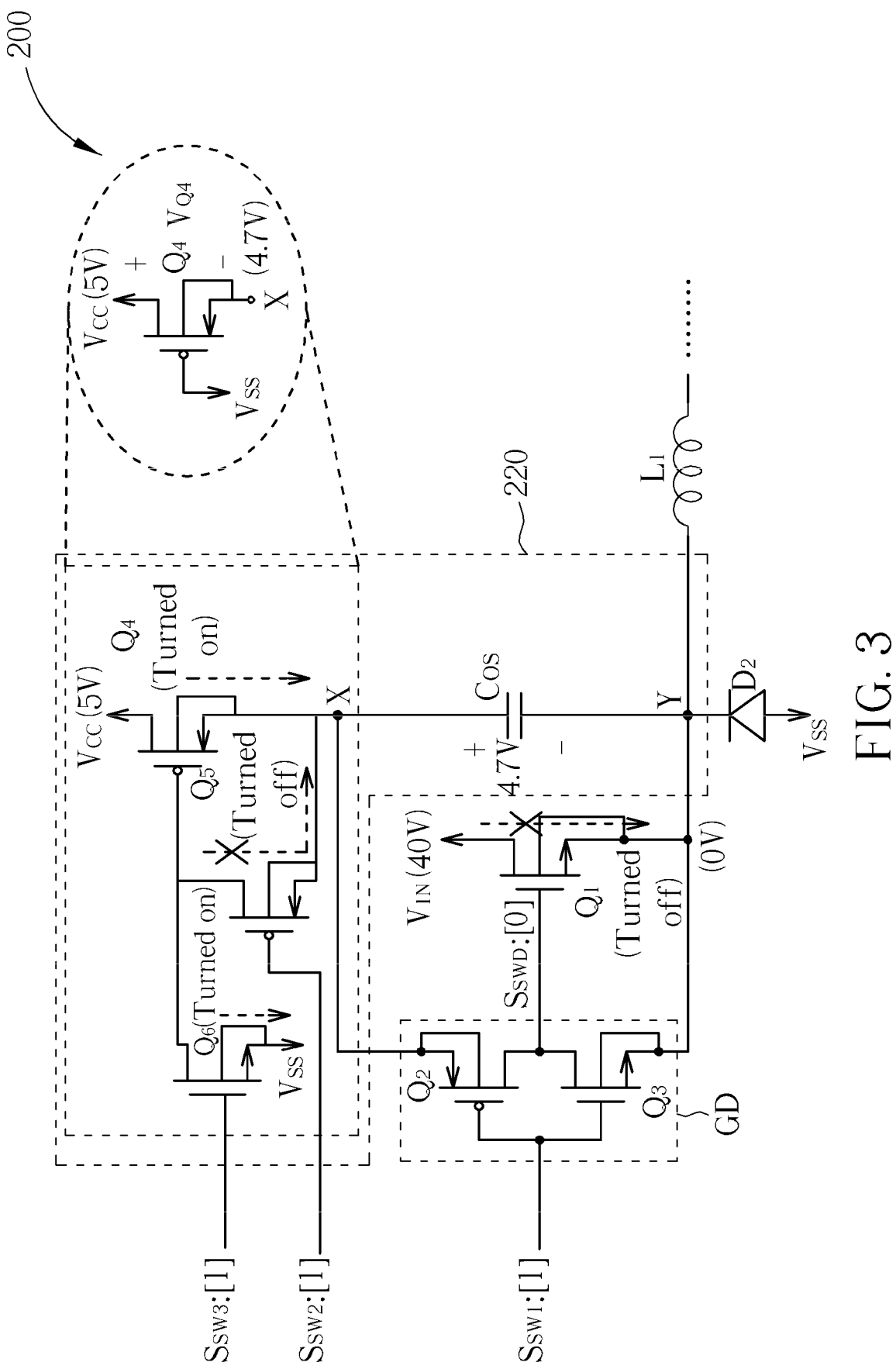
FIG. 3 is a diagram illustrating the circuit operation when the power switch of the buck circuit is turned off.

Please refer to FIG. 3. FIG. 3 is a diagram illustrating the circuit operation when the power switch $Q_1$ of the buck circuit 200 of the present invention is turned off. As shown in FIG. 3, when the transistor $Q_1$ is turned off, it means that the driving switch control signal $S_{SWD}$ is logic "0" and the switch control signal $S_{SW1}$ is logic "1". Meanwhile, the power of the voltage source $V_{IN}$ is not conducted to the node Y. That is, the voltage $V_Y$ on the node Y is 0 volt or less at the time. Meanwhile, the bootstrap circuit 220 of the present invention turns off the transistor $Q_5$ by the switch control signal $S_{SW2}$ with logic "1" and turns on the transistor $Q_6$ by means of the switch control signal $S_{SW3}$ witch logic "1". In this way, it can be seen in FIG. 3 that the gate of the transistor $Q_4$ is coupled to the voltage source $V_{SS}$ (the ground end) through the transistor $Q_6$ so that the transistor $Q_4$ is turned on. The voltage drop $V_{Q4}$ between the drain and the gate of the transistor $Q_4$ is about 0.3 volt when the transistor $Q_4$ is turned on. Hence, the voltage source $V_{CC}$ with 5 volts can charge the offset capacitor $C_{OS}$ up to 4.7 volts (deducting the voltage drop $V_{Q4}$). It means that the voltage $V_X$ on the node X is 4.7 volts at the time. That is, the voltage range of the gate driving circuit GD capable of driving is from 0 volt to 4.7 volts by means of the voltage $V_X$ on the node X and the voltage $V_Y$ on the node Y at the time. In this way, as long as the driving switch control signal $S_{SWD}$ is lower than the threshold voltage $V_{TH1}$ of the transistor $Q_1$, the transistor $Q_1$ can be effectively turned off.

Figure 4:
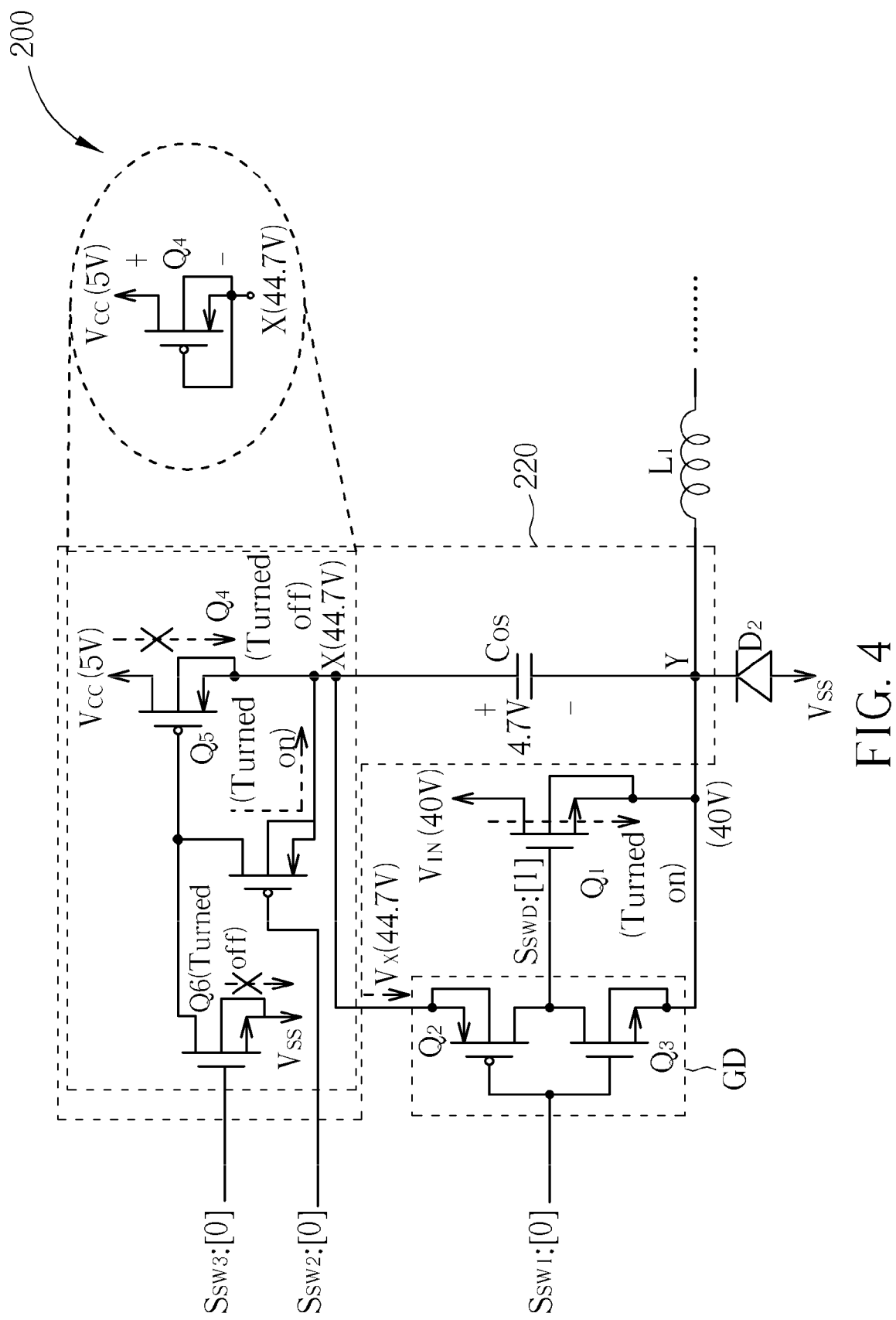

Please refer to FIG. 4. FIG. 4 is a diagram illustrating the circuit operation when the power switch $Q_1$ of the buck circuit 200 of the present invention is turned on. As shown in FIG. 4, when the transistor $Q_1$ is turned on, it means that the driving switch control signal $S_{SWD}$ is logic "1" and the switch control signal $S_{SW1}$ is logic "0". Meanwhile, the power of the voltage source $V_{IN}$ is conducted to the node Y, which means the voltage $V_Y$ on the node Y is 40 volts at the time. Supposed that the offset capacitor $C_{OS}$ has finished charging, therefore the voltage $V_X$ on the node X is 44.7 volts. The bootstrap circuit 220 turns on the transistor $Q_5$ by means of the switch control signal $S_{SW2}$ with the logic "0", and turns off the transistor $Q_6$ by means of the switch control signal $S_{SW3}$ with the logic "0". In this way, it can be seen in FIG. 4 that the gate of the transistor $Q_4$ is coupled to the source of the transistor $Q_4$ (the node X) through the turned-on transistor $Q_5$. Since the voltage $V_X$ on the node X is 44.7 volts at the time, the transistor $Q_4$ is turned off. In this way, the power of the voltage source $V_{IN}$ is not conducted to the voltage source $V_{CC}$, at the relatively low voltage level compared to the voltage source $V_{IN}$, through the turned-on transistor $Q_1$ and the offset capacitor $C_{OS}$ because the transistor $Q_4$ is turned off. In this way, the voltage source $V_{CC}$ is prevented from being damaged by the power of the voltage source $V_{IN}$. The voltage range of the gate driving circuit GD capable of driving is from 40 volts to 44.7 volts by means of the voltage $V_X$ on the node X and the voltage $V_Y$ on the node Y at the time. In this way, as long as the driving switch control signal $S_{SWD}$ is higher than the threshold voltage $V_{TH1}$ of the transistor $Q_1$, the transistor $Q_1$ can be effectively turned on.

Therefore, according to the abovementioned description about FIG. 3 and FIG. 4, by means of providing the bias voltages $V_X$ and $V_Y$ from the bootstrap circuit 220 to the gate driving circuit GD, the switch control signal $SW_1$ can effectively turn the transistor $Q_1$ on or off through the gate driving circuit GD and meanwhile prevent the voltage source $V_{IN}$ from damaging the voltage source $V_{CC}$.

Figure 5:
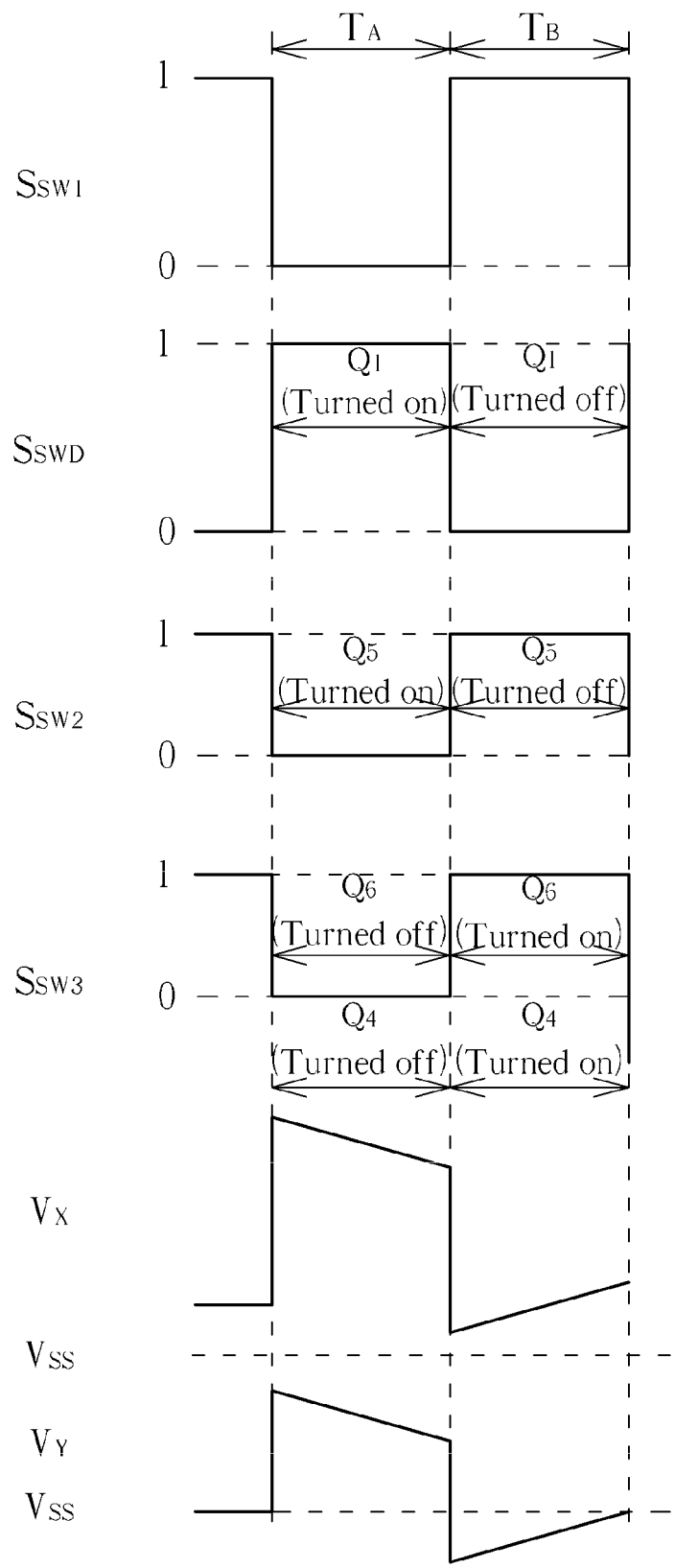
FIG. 5 is a time diagram illustrating the operational relation between the internal signals of the buck circuit.

Please refer to FIG. 5. FIG. 5 is a time diagram illustrating the operational relation between the internal signals of the buck circuit 200 of the present invention. As shown in FIG. 5, the period $T_A$ represents the period that the transistor $Q_1$ is turned on; the period $T_B$ represents the period that the transistor $Q_1$ is turned off. During the period $T_A$, the transistors $Q_1$ and $Q_5$ are turned on and the transistors $Q_4$ and $Q_6$ are turned off. On the contrary, during the period $T_B$, the transistors $Q_4$ and $Q_6$ are turned on, and the transistors $Q_1$ and $Q_5$ are turned off. The voltages $V_X$ and $V_Y$ also vary based on the on/off states of the transistors $Q_1$, $Q_4$, $Q_5$ and $Q_6$.

In conclusion, by means of the bootstrap circuit provided by the present invention, the required voltage level of the voltage source can be effectively lowered, and the buck circuit utilizing an NMOS transistor as power switch can switch correctly (fully turned on/off) for providing the correct output voltage source, causing a great convenience.

Those skilled in the art will readily observe that numerous modifications and alterations of the device and method may be made while retaining the teachings of the invention.

What is claimed is:

1. A bootstrap circuit, applied in a bulk circuit, the bulk circuit having an inductor, a diode, a voltage divider, a switch control circuit, a gate driving circuit, and a first transistor, the inductor having a first end and a second end, for generating an output voltage, the diode coupled between the first end of the inductor and a first voltage source, the voltage divider coupled between the second end of the inductor and the first voltage source, for generating a feedback voltage according to a partial voltage of the output voltage, the switch control circuit for generating a first, a second and a third switch control signals according to the feedback voltage, the gate driving circuit coupled to the switch control circuit for generating a driving switch control signal according to the first switch control signal, the first transistor having a first end coupled to a input voltage source, a second end coupled to the first end of the inductor, and a control end coupled to the gate driving circuit, the first transistor coupling the first end of the first transistor to the second end of the first transistor according to the gate driving signal, the bootstrap circuit comprising:

a second transistor, comprising:
   a first end, coupled to a second voltage source;
   a second end; and
   a control end;
   wherein the second transistor couples the first end of the second transistor to the second end of the second transistor according to a signal of the control end of the second transistor;

a third transistor, comprising:
   a first end, coupled to the control end of the second transistor;
   a second end, coupled to the second end of the second transistor; and a control end, coupled to the switch control circuit for receiving the second switch control signal;
wherein the third transistor couples the first end of the third transistor to the second end of the third transistor according to the second switch control signal;
a fourth transistor, comprising:
a first end, coupled to the control end of the second transistor;
a second end, coupled to the first voltage source; and
a control end, coupled to the switch control circuit for receiving the third switch control signal;
wherein the fourth transistor couples the first end of the fourth transistor to the second end of the fourth transistor according to the third switch control signal; and
an offset capacitor, comprising:
a first end, coupled to the second end of the second transistor; and
a second end, coupled to the first end of the inductor.

2. The bootstrap circuit of claim 1, wherein the first transistor and the fourth transistor are NMOS transistors, and the second transistor and the third transistor are PMOS transistors.

3. The bootstrap circuit of claim 1, wherein the gate driving circuit comprises:
a fifth transistor, comprising:
a first end, coupled to the first end of the offset capacitor;
a second end, coupled to the control end of the first transistor, for outputting the driving switch control signal; and
a control end, coupled to the switch control circuit, for receiving the first switch control signal; and
a sixth transistor, comprising:
a first end, coupled to the control end of the first transistor, for outputting the driving switch control signal;
a second end, coupled to the second end of the offset capacitor; and
a control end, coupled to the switch control circuit, for receiving the first switch control signal.

4. The bootstrap circuit of claim 3, wherein the fifth transistor is a PMOS transistor, and the sixth transistor is an NMOS transistor.

5. The bootstrap circuit of claim 4, wherein the driving switch control signal is inverted to the first switch control signal.

6. The bootstrap circuit of claim 1, wherein the first switch control signal, the second switch control signal and the third switch control signal are the same.

7. The bootstrap circuit of claim 1, wherein the first switch control signal, the second switch control signal and the third switch control signal are similar signals, and phases of the first switch control signal, the second switch control signal and the third switch control signal are different.

8. The bootstrap circuit of claim 1, wherein when the first switch control signal turns on the first transistor, the second control signal turns on the third transistor, and the third switch control signal turns off the fourth transistor so as to turn off the second transistor.

9. The bootstrap circuit of claim 1, wherein when the first switch control signal turns off the first transistor, the second control signal turns off the third transistor, and the third switch control signal turns on the fourth transistor so as to turn on the second transistor.

10. The bootstrap circuit of claim 1, wherein the first voltage source is a ground end.

11. The bootstrap circuit of claim 1, wherein the second voltage source is generated by the input voltage source through a Low Drop Out (LDO) regulator.

12. The bootstrap circuit of claim 1, wherein the voltage divider comprises:
a first feedback resistor, coupled to the second end of the inductor; and
a second feedback resistor, coupled between the first feedback resistor and the first voltage source.

13. The bootstrap circuit of claim 1, wherein the first transistor is utilized as a power switch.

14. The bootstrap circuit of claim 1, wherein the buck circuit further comprises an output capacitor, coupled between the second end of the inductor and the first voltage source.

15. A buck circuit, comprising:
an inductor, comprising:
a first end; and
a second end, for generating an output voltage;
a diode, coupled between the first end of the inductor and the first voltage source;
a voltage divider, coupled between the second end of the inductor and the first voltage source, for generating a feedback voltage according the a partial voltage of the output voltage;
a switch control circuit, for generating a first switch control signal, a second switch control signal, and a third switch control signal according to the feedback voltage;
a gate driving circuit, coupled to the switch control circuit, for generating a driving switch control signal according to the first switch control signal;
a first transistor, comprising:
a first end, coupled to an input voltage source;
a second end, coupled to the first end of the inductor; and
a control end, coupled to the gate driving circuit;
wherein the first transistor couples the first end of the first transistor to the second end of the first transistor according to the driving switch control signal; and
a bootstrap circuit, comprising:
a second transistor, comprising:
a first end, coupled to the second voltage source;
a second end; and
a control end;
wherein the second transistor couples the first end of the second transistor to the second end of the second transistor according to a signal of the control end of the second transistor;
a third transistor, comprising:
a first end, coupled to the control end of the second transistor;
a second end, coupled to the second end of the second transistor; and
a control end, coupled to the switch control circuit, for receiving the second switch control signal;
wherein the third transistor couples the first end of the third transistor to the second end of the third transistor according to the second switch control signal;
a fourth transistor, comprising:
a first end, coupled to the control end of the second transistor;
a second end, coupled to the first voltage source; and
a control end, coupled to the switch control circuit, for receiving the third switch control signal;
wherein the fourth transistor couples the first end of the fourth transistor to the second end of the fourth transistor according to the third switch control signal; and
an offset capacitor, comprising:

a first end, coupled to the second end of the second transistor; and a second end, coupled to the first end of the inductor.

16. The buck circuit of claim 15, wherein the first transistor and the fourth transistor are NMOS transistors, and the second transistor and the third transistor are PMOS transistors.

17. The buck circuit of claim 15, wherein the gate driving circuit comprises:

a fifth transistor, comprising:
  a first end, coupled to the first end of the offset capacitor;
  a second end, coupled to the control end of the first transistor, for outputting the driving switch control signal; and
  a control end, coupled to the switch control circuit, for receiving the first switch control signal; and a sixth transistor, comprising:
  a first end, coupled to the control end of the first transistor, for outputting the driving switch control signal;
  a second end, coupled to the second end of the offset capacitor; and
  a control end, coupled to the switch control circuit, for receiving the first switch control signal.

18. The buck circuit of claim 17, wherein the fifth transistor is a PMOS transistor, and the sixth transistor is an NMOS transistor.

19. The buck circuit of claim 18, wherein the driving switch control signal is inverted to the first switch control signal.

20. The buck circuit of claim 15, wherein the first switch control signal, the second switch control signal and the third switch control signal are the same.

21. The buck circuit of claim 15, wherein the first switch control signal, the second switch control signal and the third switch control signal are similar signals, and phases of the first switch control signal, the second switch control signal and the third switch control signal are different.

22. The buck circuit of claim 15, wherein when the first switch control signal turns on the first transistor, the second control signal turns on the third transistor, and the third switch control signal turns off the fourth transistor so as to turn off the second transistor.

23. The buck circuit of claim 15, wherein when the first switch control signal turns off the first transistor, the second control signal turns off the third transistor, and the third switch control signal turns on the fourth transistor so as to turn on the second transistor.

24. The buck circuit of claim 15, wherein the first voltage source is a ground end.

25. The buck circuit of claim 15, wherein the second voltage source is generated by the input voltage source through a Low Drop Out (LDO) regulator.

26. The buck circuit of claim 15, wherein the voltage divider comprises:
  a first feedback resistor, coupled to the second end of the inductor; and
  a second feedback resistor, coupled between the first feedback resistor and the first voltage source.

27. The buck circuit of claim 15, wherein the first transistor is utilized as a power switch.

28. The buck circuit of claim 15, further comprising an output capacitor, coupled between the second end of the inductor and the first voltage source.

* * * * *